United States Patent
Takahashi

(10) Patent No.: US 7,575,243 B2
(45) Date of Patent: Aug. 18, 2009

(54) STRUCTURE MOUNTING REAR SUSPENSION

(75) Inventor: Nobuyuki Takahashi, Novi, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 358 days.

(21) Appl. No.: 11/510,907

(22) Filed: Aug. 28, 2006

(65) Prior Publication Data

US 2008/0048409 A1    Feb. 28, 2008

(51) Int. Cl.
B60G 3/12 (2006.01)

(52) U.S. Cl. .................. 280/124.128; 280/124.11; 280/781

(58) Field of Classification Search .......... 280/781, 280/124.11, 124.128
See application file for complete search history.

(56) References Cited

U.S. PATENT DOCUMENTS

| | | | |
|---|---|---|---|
| 4,537,420 A | 8/1985 | Ito et al. | |
| 4,765,647 A | 8/1988 | Kondo et al. | |
| 5,009,449 A | 4/1991 | Edahiro et al. | |
| 5,150,918 A | 9/1992 | Heitzmann | |
| 5,246,248 A | 9/1993 | Ferguson | |
| 5,288,100 A | 2/1994 | Cherry et al. | |
| 5,741,026 A * | 4/1998 | Bonnville | 280/781 |
| 5,879,026 A * | 3/1999 | Dostert et al. | 280/781 |
| 5,895,063 A * | 4/1999 | Hasshi et al. | 280/124.134 |
| 6,109,630 A * | 8/2000 | Dazy et al. | 280/124.11 |
| 6,209,895 B1 | 4/2001 | Mueller et al. | |
| 6,234,502 B1 | 5/2001 | Sobina | |
| 6,354,614 B1 | 3/2002 | Ham, Jr. et al. | |
| 6,416,136 B1 | 7/2002 | Smith | |
| 6,702,309 B2 * | 3/2004 | Cho | 280/124.166 |
| 7,165,777 B2 * | 1/2007 | Ziech et al. | 280/124.11 |
| 7,234,713 B1 * | 6/2007 | Vander Kooi et al. | 280/124.106 |
| 7,325,820 B2 * | 2/2008 | Allen et al. | 280/124.15 |
| 2001/0019216 A1 | 9/2001 | Kobayashi | |
| 2006/0061142 A1 | 3/2006 | Kobayashi et al. | |

* cited by examiner

*Primary Examiner*—Paul N Dickson
*Assistant Examiner*—Nicole Verley
(74) *Attorney, Agent, or Firm*—Young Basile

(57) ABSTRACT

A vehicle suspension structure includes a frame member having a first side portion and a bottom portion. The bottom portion extends in a first direction relative to the first side portion. The structure also includes a suspension mounting member attached to the first side portion of the frame member. The suspension mounting member extends in a second direction that is opposite of the first direction. The structure also includes a support bracket attached to the bottom portion of the frame member and the suspension mounting member. The structure further includes a suspension member rotatably coupled to the suspension mounting member and supporting a vehicle wheel.

17 Claims, 5 Drawing Sheets

STRUCTURE MOUNTING REAR SUSPENSION

TECHNICAL FIELD

The present invention generally relates to a vehicle suspension, and more specifically to reinforcing components that attach a rear vehicle swing-arm type suspension to a vehicle body.

BACKGROUND

A typical rear suspension for a front wheel drive vehicle may include a pair of trailing arms that rotatably interconnect a pair of rear wheels to the body of the vehicle. In many of these applications, each trailing arm has a socket that is rotatably connected one of a pair of tubular frame members that are provided to stiffen the body. Also, the trailing arms may be interconnected by a rear cross member. A spindle is used to rotatably interconnect each trailing arm with a rear wheel.

Additionally, springs and shock absorbers are typically provided to dampen the relative rotation of the trailing arms relative to the body, thereby permitting the rear wheels to move at least vertically relative to the body while preventing the body from experiencing the vertical motion and jolts experienced by the rear wheels.

Typically, each trailing arm is positioned directly under a tubular frame member and connected thereto with a bracket. The bracket may include a pair of opposing plates that are welded to the tubular frame member with a portion of the trailing arm located between portions of the plates. A bolt may be inserted through holes in the plates and the trailing arm to permit rotation of the trailing arm relative to the frame.

For lateral support, the trailing arms may be connected to the body with a lateral adjustable-length bar, or the trailing arms may be interconnected by a cross member. To provide lateral stiffness, the plates that interconnect the trailing arms to frame members are generally stiff, reinforced members that extend along the tubular frame members to resist deflection.

Additionally, many vehicles include spot welds to connect body panels and other components. Many times, spot welds are provided to stiffen two adjacent components while fixing the components in a relative position. Beads, or elongated arcuate portions formed within a stamped metal component may also be provided to stiffen a component.

While the above described interconnection for a trailing arm to a vehicle body provides for a structurally stiff connection that resists deflection of the plates under loading as forces are transmitted between the trailing arms and the tubular frame members, the connection requires that the trailing arm socket is positioned directly below the tubular frame member.

SUMMARY

An illustrative embodiment of a vehicle suspension structure includes a frame member having a first side portion and a bottom portion. The bottom portion extends in a first direction relative to the first side portion. The structure also includes a suspension mounting member attached to the first side portion of the frame member. The suspension mounting member extends in a second direction that is opposite of the first direction. The structure also includes a support bracket attached to the bottom portion of the frame member and the suspension mounting member. The structure further includes a suspension member rotatably coupled to the suspension mounting member and supporting a vehicle wheel.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
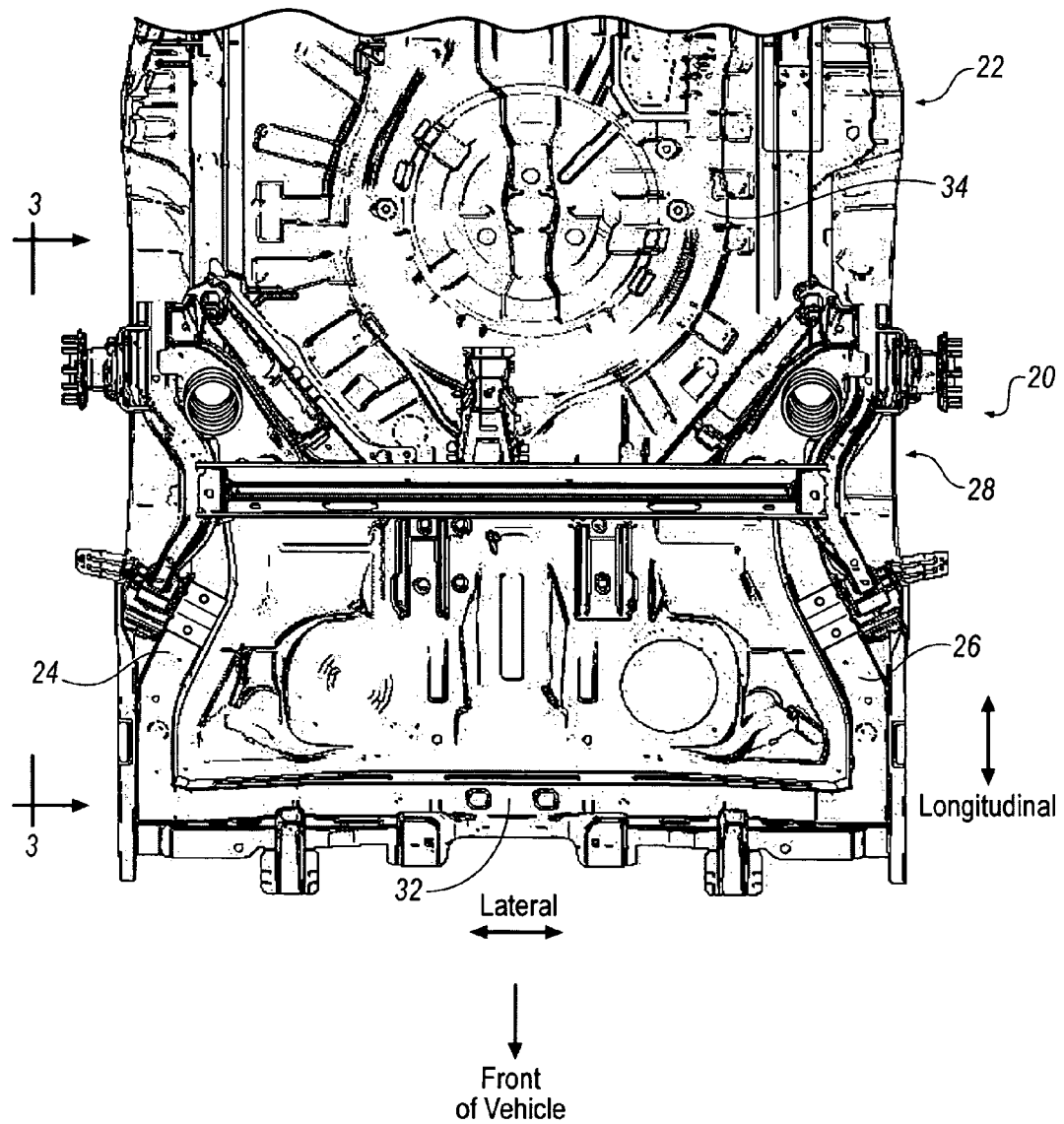
FIG. 1 is a partial bottom view of a vehicle, according to an embodiment.

FIG. 1 illustrates a portion of a vehicle 20, as viewed from below. Vehicle 20 includes a body 22, a first tubular frame member 24, a second tubular frame member 26, and a rear suspension 28. Body 22 includes a floor pan 32 and a trunk pan 34. The frame members 24, 26 extend generally longitudinally along the bottom of the body 22 to stiffen the body 22 and provide an attachment for the rear suspension 28.

Figure 2:
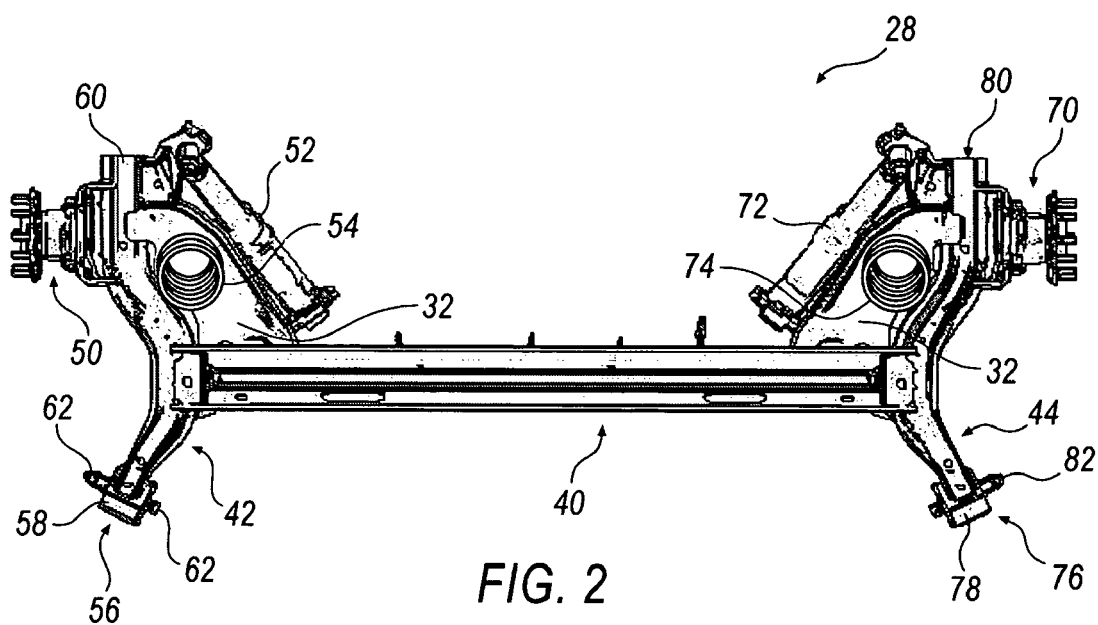
FIG. 2 is a view of a portion of FIG. 1, illustrating portions of a rear suspension according to an embodiment.

As best seen in FIG. 2, the rear suspension 28 includes a cross member 40 interconnecting a first suspension member, or first trailing arm, 42 and a second suspension member, or second trailing arm, 44. The first trailing arm 42 is connected to a first spindle 50, a first shock absorber 52, and a first coil spring 54. The first trailing arm 42 extends from a first forward end 56, having a first socket 58, to a first rearward end 60. A first trailing arm pin 62 extends through the first socket 58.

The second trailing arm 44 is connected to a second spindle 70, a second shock absorber 72, and a second coil spring 74. The second trailing arm 44 extends from a second forward end 76, having a second socket 78, to a second rearward end 80. A second trailing arm pin 82 extends through the second socket 78.

Figure 3:
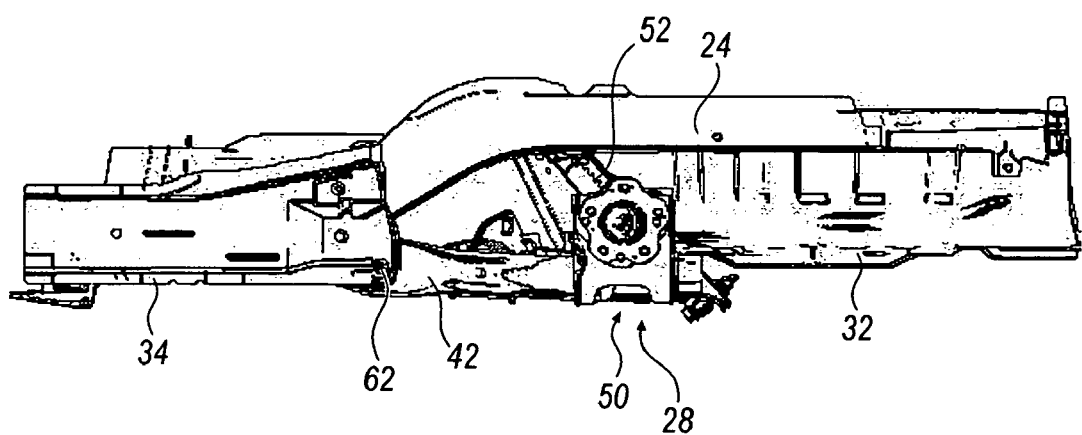
FIG. 3 is a side elevational view of the rear suspension of FIG. 1, taken along the line 3-3 of FIG. 1, with portions removed for clarity.
Figure 4:
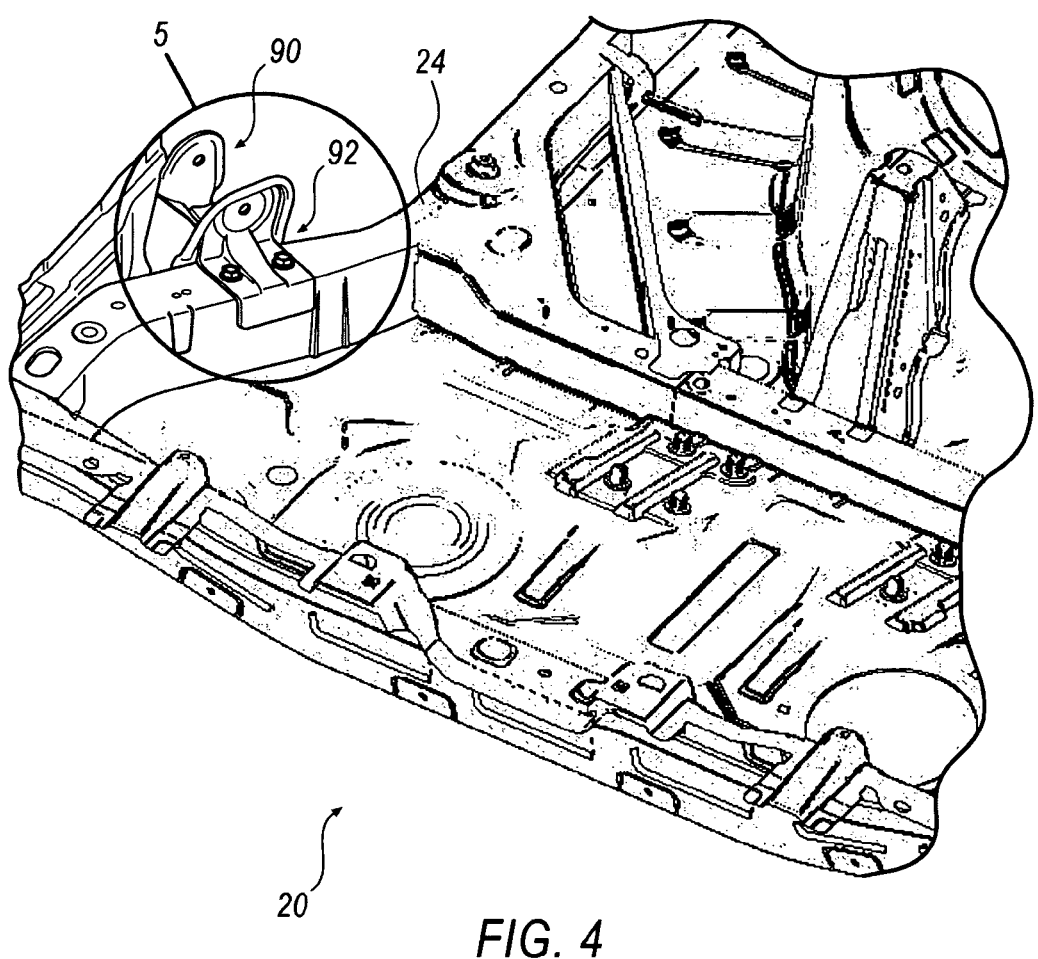
FIG. 4 is a partial perspective view of the vehicle of FIG. 1, with portions removed for clarity.

FIG. 3 illustrates a side view of the rear suspension 28, showing relative positioning of components when the rear suspension 28 is in about a loaded configuration. As will be appreciated, in the loaded configuration, the springs 54, 74 are partially compressed due to the weight of the vehicle 20 being partially supported by the rear wheels (not shown) via the rear suspension 28. In an unloaded configuration (not shown), the springs 54, 74 are not compressed. The trailing arms 42, 44 rotate about the axes of pins 62, 82 relative the frame members 24, 26. The spindles 50, 70 interconnect the trailing arms 42, 44 to rear wheels of the vehicle 20, while permitting relative rotation therebetween.

FIGS. 4-7 illustrate a portion of the vehicle 20 showing the attachment between the first frame member 24 and the first trailing arm 42 to include a first suspension mounting member, or first trailing arm bracket 90 and a first support bracket, or first reinforcing bracket, 92. The trailing arm bracket 90 includes an inboard ear 100, an outboard ear 102, and a ear connector 104 extending therebetween.

Figure 8:
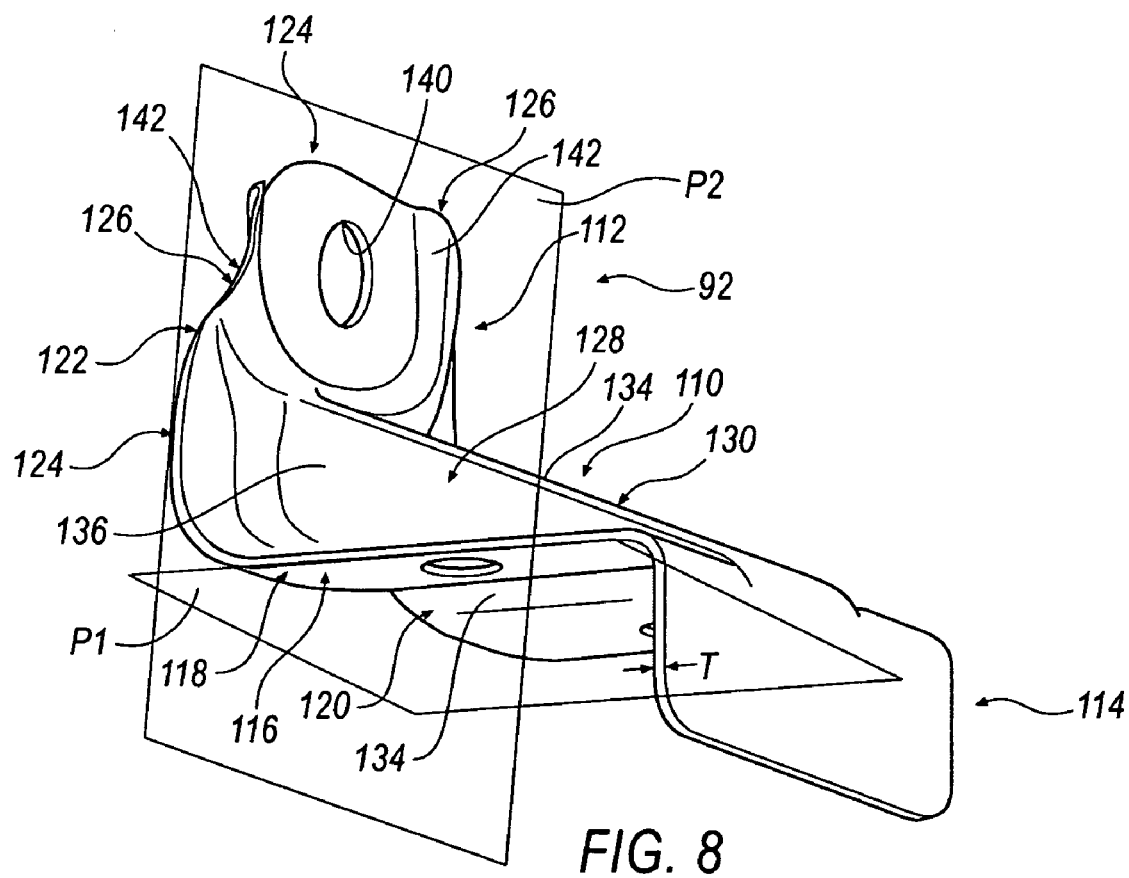
FIG. 8 is a perspective view of a bracket illustrated in FIG. 5.

Referring to FIG. 8, the reinforcing bracket 92 includes a first reinforcing bracket portion 110, a second reinforcing bracket portion 112, and a third reinforcing bracket portion, or frame support portion, 114. The first reinforcing bracket portion 110 has a first reinforcing bracket surface 116. The first reinforcing bracket surface 116 includes a first mating surface 118 generally defining a first plane P1, and a first bead surface 120. The second reinforcing bracket portion 112 has a second reinforcing bracket surface 122. The second reinforcing bracket surface 122 includes a second mating surface 124 generally defining a second plane P2, and a second bead surface 126. The first reinforcing bracket portion 110 has a first reinforcing bracket bead 128 formed therein. The first reinforcing bracket bead 128 extends from the third reinforcing bracket portion 118 toward the second reinforcing bracket portion 112, and includes a generally curvilinear wall 130 with a first bead wall portion 132 that extends away from the first plane P1, a second bead wall portion 134 that extends generally parallel to the plane P1, and a third bead wall portion 136 that extends from the second bead wall portion 134 to the plane P1.

The second reinforcing bracket portion 112 includes a trailing arm connecting portion 140 and a second reinforcing bracket bead 142 formed therein. The second reinforcing bracket bead 142 is partially defined by the second bead surface 126. In the embodiment shown, the trailing arm connecting portion 140 is an aperture extending through the thickness T of the second reinforcing bracket portion 112 and extending from the second plane P2, and the second reinforcing bracket bead 142 partially encircles the trailing arm connecting portion 140.

In the embodiment shown, the first plane P1 is generally perpendicular to the second plane P2. Therefore, the first reinforcing bracket portion 110 and the second reinforcing bracket portion 112 are orientated at about a right angle relative to one another. Also, the third reinforcing bracket portion 114 and the second reinforcing bracket portion 112 are orientated at about a right angle relative to one another. The first reinforcing bracket bead 128 intersects the second reinforcing bracket bead 142. As illustrated, the first reinforcing bracket bead 128 and the second reinforcing bracket bead 142 provide a channel C (FIG. 7) generally defined by a surface portion of the reinforcing bracket 92 that is not co-planar with either plane P1 or plane P2. Additionally, the beads 128, 142 may be described as portions of the reinforcing bracket 92 having a bead surface 120, 126 that is not co-planar with either plane P1 or plane P2.

Figure 7:
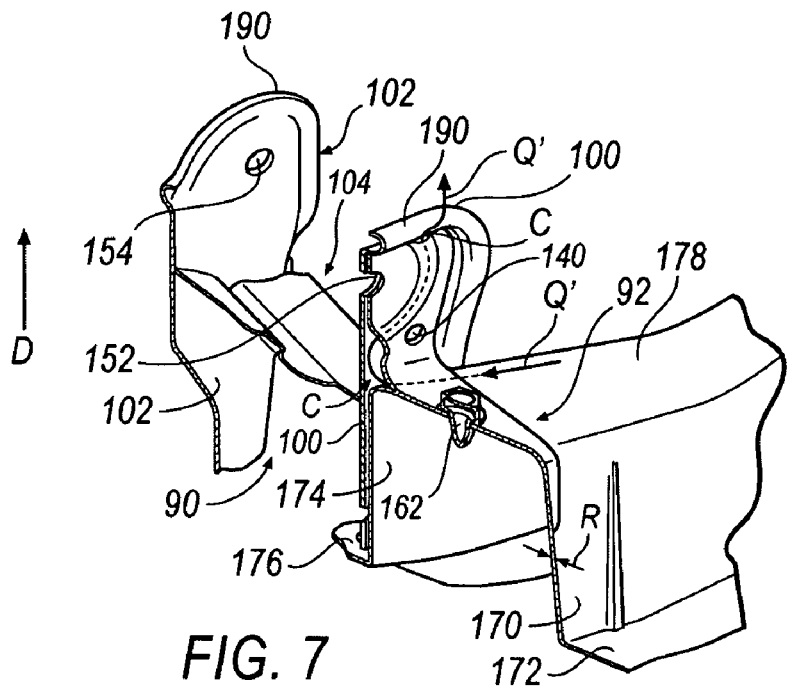
FIG. 7 is a sectional view taken along line 7-7 in FIG. 5.

As best seen FIG. 7, the ear connector 104 has a trailing arm bead 150 formed therein that extends between the inboard ear 100 and the outboard ear 102. The inboard ear 100 includes an inboard aperture 152, and the outboard ear 102 includes an outboard aperture 154. The first trailing arm pin 62 extends through the first socket 58, as mentioned earlier, the trailing arm connecting portion 140, the inboard aperture 152, and the outboard aperture 154.

Figure 5:
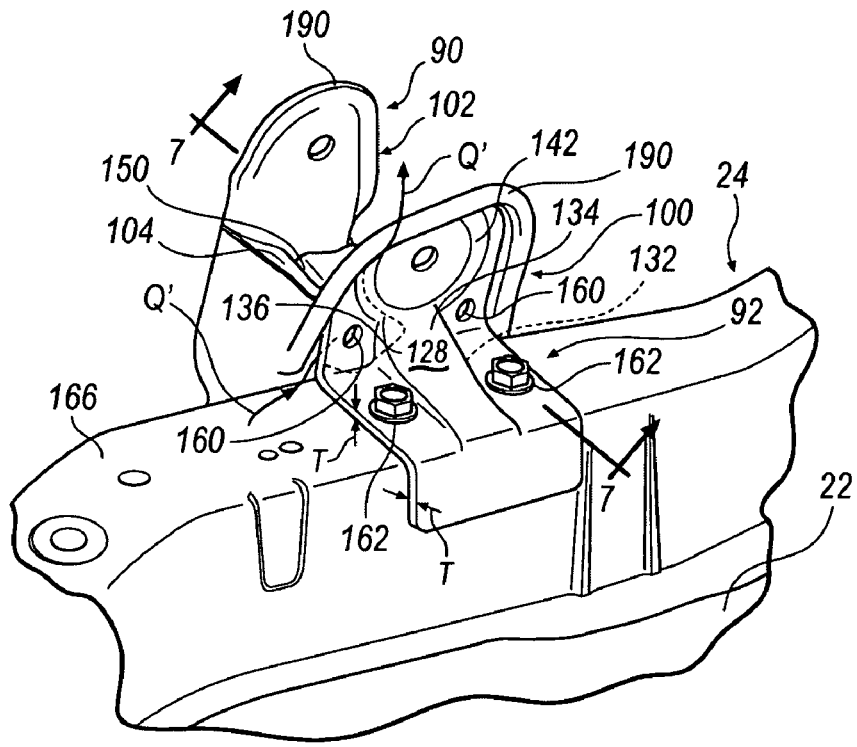
FIG. 5 is an enlarged view of portion 5 of FIG. 4.
Figure 6:
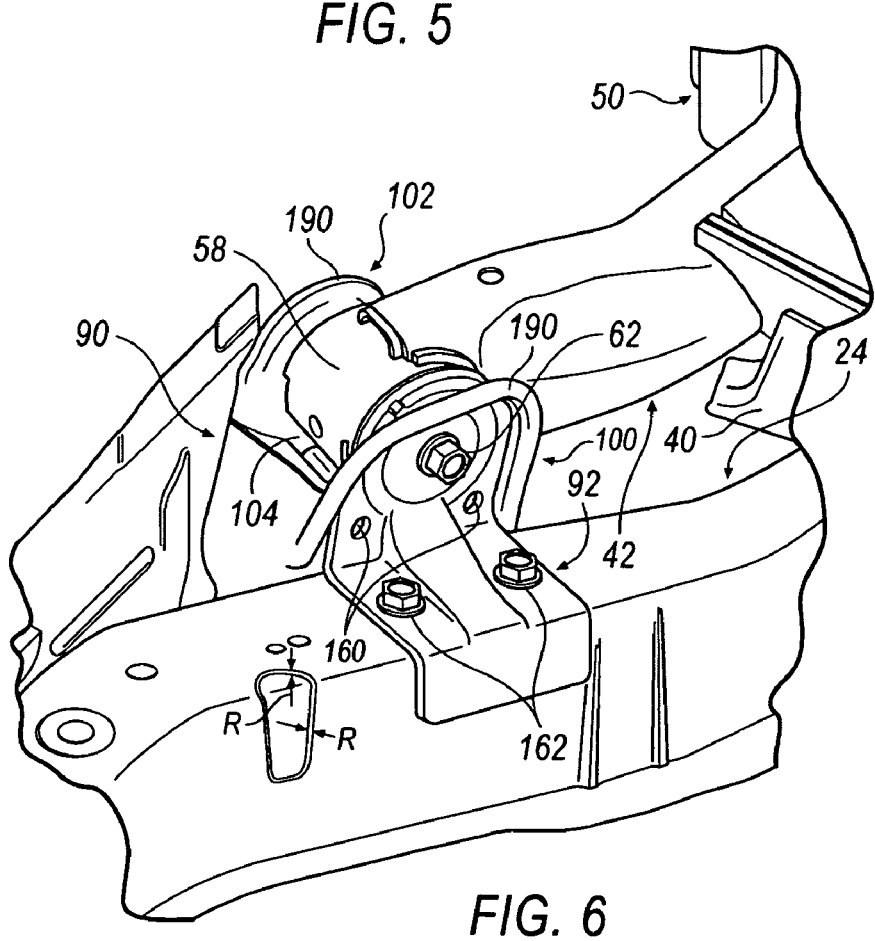
FIG. 6 is an enlarged partial perspective view, taken generally from the same vantage as FIG. 5, with fewer portions removed.

FIGS. 5 and 6 further illustrate a pair of spot welds 160 that fix the trailing arm connecting portion 140 to the inboard ear 100. A pair of bolts 162 connect the first reinforcing bracket portion 110 to the first frame member 24. The first frame member 24 is illustrated to further include a generally elongated tubular body 166 that extends longitudinally along the body 22.

Thus, the trailing arm connecting portion 140 of the reinforcing bracket 92 is stiffened by both the spot welds 160 and the second reinforcing bracket bead 142, notwithstanding the connection of the first trailing arm pin 62. In addition, the inboard ear 100 is stiffened by both the spot welds 160 and the second reinforcing bracket bead 142. Accordingly, the trailing arm bracket 90 is stiffened (by the spot welds 160 and the second reinforcing bracket bead 142) to resist deflection under loading as forces are transmitted between the first trailing arm 42 and the first tubular frame member 24. Also the reinforcing bracket 92 provides increased stiffness to the connection between the first frame member 24 and the first trailing arm 42 due to the angle between the planes P1 and P2, and the bracing provided by the first reinforcing bracket bead 128. Therefore, the first trailing arm 42 is not positioned directly under the first tubular frame member 24, but is positioned laterally to the first tubular frame member 24, as best seen in FIG. 5. Also, the stiffness of the trailing arm bracket 90 is increased by the reinforcing bracket 90 and the interconnection thereto.

As best illustrated in FIG. 7, the first tubular member 24 is formed of a sheet steel having a thickness R. The tubular body 166 of the frame member 24 is illustrated to include an inboard frame wall 170 with an inboard tab 172 extending therefrom, an outboard frame wall 174 with an outboard tab 176 extending therefrom, and an integral connecting frame wall 178 extending therebetween. In the embodiment illustrated, the tabs 172, 176 are seam welded to the body 22. Thus provided, the frame member 24 is generally defined by a generally rectangular tubular frame portion that includes four sides defined by a portion of the body 22, the inboard frame wall 170, the outboard frame wall 174, and the connecting frame wall 178. For purposes of this discussion, the tubular frame portion does not include the tabs 172, 176.

Also illustrated in FIG. 7 is a first flow path Q for fluids (not shown) that collect between the inboard ear 100 and the reinforcing bracket 92. FIG. 5 illustrates a second flow path Q' for fluids (not shown) that also collect between the inboard ear 100 and the reinforcing bracket 92. Fluids enter the partially enclosed space between the first frame member 24, the inboard ear 100 and the reinforcing bracket 92. These fluids drain through the first reinforcing bracket bead 128, through the second reinforcing bracket bead 142, and out of the partially enclosed space (note that the views of FIGS. 4-8 are inverted such that fluids drain in the direction of arrow D in FIG. 7).

With reference again to FIGS. 4-7, the ears 100, 102 of the trailing arm bracket 90 have folded edges 190 that provide additional stiffness to the ears 100, 102 to resist deflection under loading as forces are transmitted between the first trailing arm 42 and the first tubular frame member 24.

As will be appreciated, the reinforcing bracket 92 is a stamped metal bracket where a sheet of metal is punched and stamped. Additionally, the trailing arm bracket 90 may be stamped metal. In the embodiment illustrated, the first reinforcing bracket portion 110, the second reinforcing bracket portion 112, and the third reinforcing bracket portion 114 are generally defined by the same thickness T.

As best seen in FIG. 2, the axis of the first trailing arm pin 62 is not parallel or co-axial with the axis of the second trailing arm pin 82, and portions of the first frame member 24 are not parallel to portions of the second frame member 26. Therefore, trailing arm brackets, such as the trailing arm bracket 90 and reinforcing brackets, such as the reinforcing bracket 92 permit a trailing arm to be rotatably secured to a vehicle body while permitting the trailing arm to be positioned at a location other than directly under a tubular frame member.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A vehicle suspension structure, comprising:
   a frame member having a first side portion and a bottom portion, the bottom portion extending in a first direction relative to the first side portion;
   a suspension mounting member attached to the first side portion of the frame member, the suspension mounting member extending in a second direction that is opposite of the first direction;
   a support bracket attached to the bottom portion of the frame member and the suspension mounting member; and
   a suspension member rotatably coupled to the suspension mounting member and supporting a vehicle wheel,
   wherein the suspension mounting member provides a structural support for rotatably interconnecting the frame member with the suspension member, the support bracket includes a first support bracket portion and a second support bracket portion, the first support bracket portion has a first mating surface portion generally defining a first plane, the second support bracket portion has a second mating surface portion generally defining a second plane, the first support bracket portion has a first support bracket bead formed therein, the first support bracket bead extends toward the second support bracket portion, the second support bracket portion includes a suspension mounting member connecting portion and a second support bracket bead formed therein.

2. The structure of claim 1, wherein the support bracket is selectively bolted to the frame member and the first plane is generally perpendicular to the second plane.

3. The structure of claim 1, wherein the first support bracket bead intersects the second support bracket bead.

4. The structure of claim 1, wherein the thickness of the support bracket, measured normal to a support bracket surface portion, is generally constant throughout.

5. The structure of claim 1, wherein the support bracket is spot welded to the trailing arm bracket.

6. The structure of claim 1, wherein the trailing arm bracket includes a pair of ears, a portion of the trailing arm is selectively positioned between the ears, and wherein the ears and the first side portion are generally vertically oriented.

7. An apparatus for connecting a wheel to a vehicle body comprising:
   a frame member connected to a vehicle body and including a tubular portion defined, at least in part, by a first side, a second side, and a bottom portion;
   a trailing arm bracket in contact with the frame member; and
   a stamped metal reinforcing bracket in contact with both the frame member and the trailing arm bracket,
   wherein the trailing arm bracket, at least in part, provides a structural support for rotatably interconnecting the frame member with a trailing arm;
   wherein the reinforcing bracket includes a first reinforcing bracket portion and a second reinforcing bracket portion, the first reinforcing bracket portion has a first mating surface portion generally defining a first plane, the second reinforcing bracket portion has a second mating surface portion generally defining a second plane, the first reinforcing bracket portion has a first reinforcing bracket bead formed therein, the first reinforcing bracket bead extends toward the second reinforcing bracket portion, the second reinforcing bracket portion includes a trailing arm connecting portion and a second reinforcing bracket bead formed therein.

8. The apparatus of claim 7, wherein the frame member is an elongated rectangular frame member that extends generally longitudinally along the vehicle body, the first side is generally defined by a first plane, and the first plane is positioned between the trailing arm and the bottom portion.

9. The apparatus of claim 7, wherein the reinforcing bracket is selectively spot welded to the trailing arm bracket, and selectively bolted to the frame member.

10. The apparatus of claim 7, wherein the reinforcing bracket further includes a frame support portion extending generally perpendicularly from the first reinforcing bracket portion, wherein the first reinforcing bracket portion interconnects the second reinforcing bracket portion and the frame support portion.

11. The apparatus of claim 7, wherein the bead provides stiffness for the reinforcing bracket and permits fluids to pass between the reinforcing bracket and the trailing arm bracket.

12. The apparatus of claim 7, further comprising a trailing arm rotatably coupled to the trailing arm bracket, wherein the trailing arm bracket, at least in part, provides a structural support for rotatably interconnecting the frame member with a trailing arm, the trailing arm bracket includes a pair of bracket ears, the trailing arm includes a socket, the socket is selectively interposed between the bracket ears, and wherein the socket is not positioned below the tubular portion of the frame member.

13. The apparatus of claim 12, wherein the trailing arm is connected to the body via a spring and a shock absorber.

14. An apparatus for connecting a wheel to a vehicle body comprising:
   a trailing arm bracket in contact with a frame member &the body;
   a stamped metal reinforcing bracket in contact with both the frame member and the trailing arm bracket; and
   a trailing arm having a socket axis rotatably coupled to the trailing arm bracket, wherein the trailing arm bracket provides a structural support for rotatably interconnecting the frame member with a trailing arm,
   wherein the reinforcing bracket includes a first reinforcing bracket portion and a second reinforcing bracket portion, the first reinforcing bracket portion has a first mating surface portion generally defining a first plane, the second reinforcing bracket portion has a second mating surface portion generally defining a second plane, the first reinforcing bracket portion has a first reinforcing bracket bead formed therein, the first reinforcing bracket bead extends toward the second reinforcing bracket portion, the second reinforcing bracket portion includes a trailing arm connecting portion and a second reinforcing bracket bead formed therein.

15. The apparatus of claim 14, wherein the trailing arm bracket includes a pair of bracket ears, the trailing arm includes a socket, and the socket is selectively interposed between the bracket ears, the trailing arm is connected to the trailing arm bracket for relative rotation generally about the socket axis by an elongated member that extends through the bracket ears and the socket.

16. The apparatus of claim 14, wherein the reinforcing bracket further includes a frame support portion extending generally perpendicularly from the first reinforcing bracket portion, wherein the first reinforcing bracket portion interconnects the second reinforcing bracket portion and the frame support portion.

17. The apparatus of claim 14, further comprising
a second trailing arm having a second socket axis rotatably connected to the vehicle body; and
a cross member interconnecting the trailing arm with the second trailing arm, wherein the frame member is an elongated rectangular tubular frame member that extends generally longitudinally along the vehicle body, and the socket axis and the second socket axis are not parallel.

* * * * *